(12) United States Patent
Hoelscher

(10) Patent No.: US 6,742,600 B2
(45) Date of Patent: Jun. 1, 2004

(54) IMPLEMENT COUPLER

(75) Inventor: Darrel G. Hoelscher, Bushton, KS (US)

(73) Assignee: Hoelscher, Inc., Bushton, KS (US)

( * ) Notice: Subject to any disclaimer, the term of this patent is extended or adjusted under 35 U.S.C. 154(b) by 0 days.

(21) Appl. No.: 10/262,506

(22) Filed: Oct. 1, 2002

(65) Prior Publication Data

US 2004/0060715 A1 Apr. 1, 2004

(51) Int. Cl.$^7$ .............................................. A01B 59/00
(52) U.S. Cl. ........................................................ 172/679
(58) Field of Search ........................ 172/605, 677–680, 172/439, 445, 446–451; 280/186

(56) References Cited

U.S. PATENT DOCUMENTS

| | | |
|---|---|---|
| 2,091,009 A | 8/1937 | Osman |
| 3,193,022 A | 7/1965 | Wesley et al. |
| 3,266,817 A | 8/1966 | Engstrom |
| 3,905,619 A | 9/1975 | Sylester |
| 3,993,325 A | 11/1976 | Gravett |
| 4,076,273 A | 2/1978 | Campion |
| 4,838,015 A | 6/1989 | Mouret et al. |
| 5,531,283 A | 7/1996 | Austin et al. |
| 5,706,901 A | 1/1998 | Walters et al. |
| 5,709,274 A | 1/1998 | Herbold |
| 5,873,229 A | 2/1999 | Franet |
| 6,125,945 A | 10/2000 | Skaggs et al. |

Primary Examiner—Christopher J. Novosad
(74) Attorney, Agent, or Firm—Spencer Fane Britt & Browne LLP; Kyle L. Elliott

(57) ABSTRACT

A coupler for attaching an implement to a tractor is provided. The coupler has three pivot arrangements allowing pivoting about three axes that are generally normal to one another with two axes of pivoting lying in substantially in a first plane and the third axis of pivoting intersecting that plane at a variable angle in a second plane generally perpendicular to the first plane. The three axes of pivoting substantially intersect and the implement may be attached wherein the load from the implement is directed downwardly and over the draft arms of the tractor.

7 Claims, 4 Drawing Sheets

IMPLEMENT COUPLER

BACKGROUND OF INVENTION

Work machines such as tractors are often used to pull implements such as box blades, compactors, rollers, scrapers, etc. These implements may be supported by wheels or may drag along the ground. Implements are typically not dedicated to a particular work machine and therefore are in the need of a fast, efficient and effective means to couple the implement to the work machine (hereinafter tractor). Tractors typically have a three point hitch arrangement and many implements only use two points of the three point hitch arrangement particularly those implements utilizing one or more wheels for support. Two point hitch arrangements utilize the two draft arms which are selectively moveable between elevated and lowered positions and retainable at one of various positions between a lowered position and an elevated position. A cross bar may be secured to the draft arms to extend therebetween and is typically pivoted to the draft arms for rotation about a generally horizontal axis or an axis generally parallel to the axis of the rear wheel axles of the tractor.

Numerous types of couplers have been devised for connecting an implement to a tractor. The couplers may be divided into three categories. The first category is the coupler that attaches to a draw bar with multiple pivots trailing behind the draw bar a substantial distance. Examples of these can be found in U.S. Pat. Nos. 5,706,901, 5,531,283 and 4,838,015. This style of coupler, unless the implement is supported by front and rear wheels can apply a significant amount of downward force to the tractor hitch and can result, in some cases, in lifting the front wheels of the tractor from the ground. To avoid this, implements have been provided with front and rear wheels when such implements or their loads are heavy.

A second type of coupler releasably attaches the tongue of the implement to the draw bar as for example with a ball or pin or the like. The tongue rests on the draw bar and pivotal movement is accomplished by rotation about the ball in multi-axes or about a hitch pin through holes within the coupler arrangement. While effective, the freedom of movement about a ball or hitch pin is limited. A pintle hook is another such type of hitch.

A third form of coupler arrangement is shown in U.S. Pat. No. 2,091,009. As shown, and described, the coupler is required to be forward of the rear wheels in order to prevent lifting of the front wheels when heavy loads are encountered. To accomplish that goal, a large U-shaped yoke bridges the drive train in front of the rear wheel differential allowing pivoting in a forward and rearward direction by being hinged at pins connected to the drive train. Second and third pivots are provided to provide both steering pivoting and irregular terrain pivoting. However such an arrangement is cumbersome and eliminates, at least for modern tractors, the ability to use the seat on the tractor. Also, because of the large height of the coupler, large moments (torque) will result. Such an arrangement would also be difficult to attach an implement to the tractor and the ability to raise and lower the implement is precluded.

One common element to many of these hitches, particularly of the first and third categories just described, is the ability to provide pivoting about three distinct axes using three separate pivot arrangements. Further, the first and third categories tend to be complex mechanisms that do not accommodate the applied forces necessarily very well. Thus, there is a need for an improved coupler and tractor/implement/coupler arrangement.

SUMMARY OF INVENTION

The present invention involves the provision of a tractor, implement and coupler arrangement that includes a coupler attachable to the draft arms of a tractor and having three pivot devices for allowing the tractor and implement to pivot relative to one another about three axes. The axes of the pivots are such as to substantially intersect with one another to provide a low profile coupler arrangement. The coupler interconnects the tractor hitch arrangement and hence the tractor to an implement having a draw tongue. The tongue is preferably, at least for certain types of implements, a goose neck type tongue to help provide clearance for tight turns without interfering with the rear wheels or other portions of the tractor. The implement may use support wheels or may have support wheels that are selectively engageable with the ground or in certain cases the implements may not utilize wheels for support. The coupler permits the use of a link from the third point of a three point hitch, in a selective manner, to elevate certain implements for transport by using the three point hitch arrangement on the tractor.

BRIEF DESCRIPTION OF DRAWINGS

Like numbers utilized throughout the various Figures designate like or similar parts.

DETAILED DESCRIPTION

Figure 1:
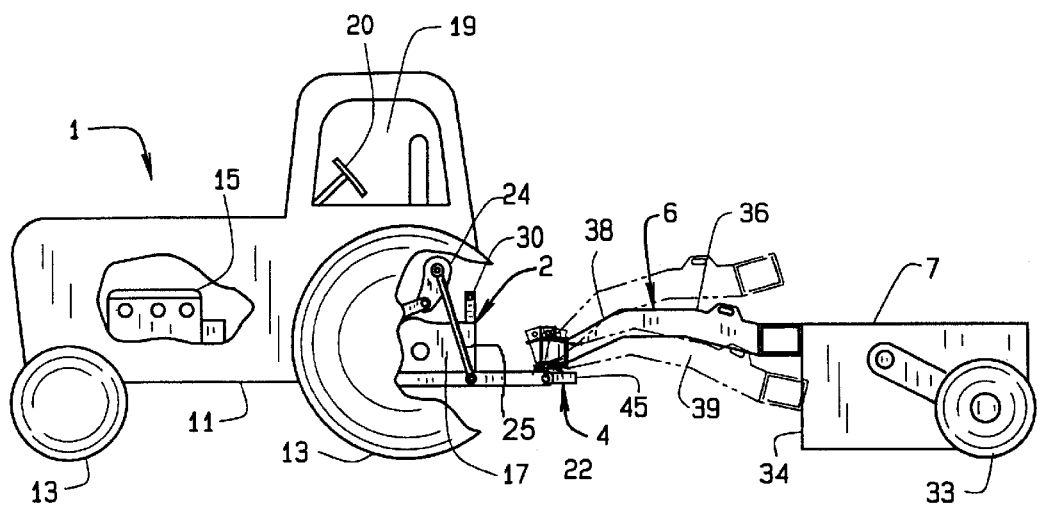
FIG. 1 is a side elevation view of a tractor, implement and coupler connecting the implement to the tractor.

A work machine (herein "tractor), designated generally 1, includes a hitch mechanism designated generally 2 that is semi-permanently attached to the tractor. A coupler device designated generally 4 is attached to the hitch 2 and a tongue 6 of an implement 7, releasably coupling the implement to the tractor 1.

The tractor 1 includes a frame 11 on which are mounted motive members 13 such as tires or tracks. A power plant 15 such as an internal combustion engine is provided and through a drive train 17 selectively drives a tractor 1 forward and/or rearward. The tractor is also steerable for left and right turns as is well known in the art. An operator station 19 is provided as well as a steering device 20 for steering the tractor during movement.

Figure 2:
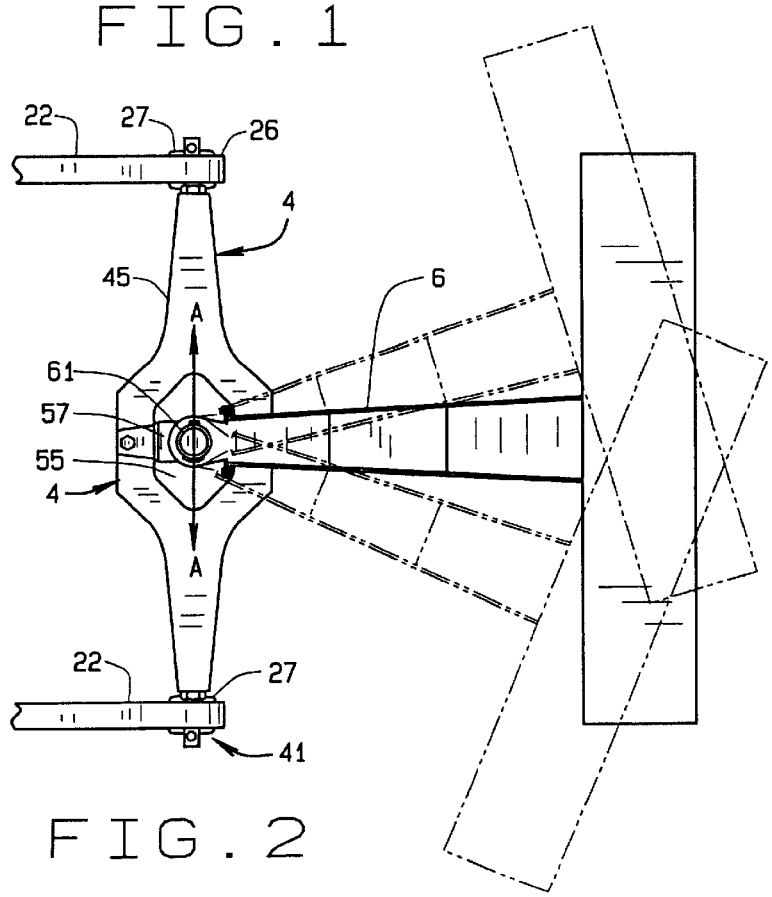
FIG. 2 is a plan view of the tractor implement and coupler as shown in FIG. 1 with various pivoted positions of the implement relative to the tractor shown in phantom.

The tractor 1 includes the hitch mechanism 2. Typical hitch mechanisms for wheeled tractors includes a three point hitch arrangement that can be used as a three point or two point hitch. The hitch 2 includes a pair of draft arms 22 pivotally mounted at their forward ends to the tractor and also to a hydraulic drive arrangement 24 via links 25 which will selectively move the draft arms 22 between a lowered position and an elevated position and is operable to selectively fix the draft arms at any position between the low and high positions. Such hitch arrangements are well know in the art. Connectors 26 are secured to the distal ends of the draft arms and preferably are balls 27 in sockets with through bores for the receipt of hitch pins 28 (FIGS. 2, 4, 6) therethrough. The draft arms 22 are mounted in a manner to permit their side to side pivoting at their mounting to the tractor whereby the distal ends can be varied in the degree of separation to accommodate different type and sizes of couplers and hitch arrangements. A three point hitch arrangement on a tractor includes an upper pivot 30 to which a link (not shown) may be connected, which link would have a free end connectable to an implement. Such three point hitch arrangements are well known in the art and need not be further described herein.

The implement 7 can be any suitable implement for example an earth scraper, box blade, compactor, roller, chisel, mower, rototiller or the like. In a preferred embodiment the implement 7 includes one or more support wheels 33 usable for supporting the implement body 34. The wheel(s) 33 may be selectively adjustable relative to the body 34 for positioning of portions of the implement relative to the ground. Mechanism may be provided to allow the wheel(s) 33 to be in a down position for transport of the implement and in an up position when the implement is to be used, for example, in a grading project. Devices for positioning the wheel(s) 33 are well known in the art. The implement 7 includes the tongue 6 which in the illustrated structure is a, goose neck type tongue having an elevated bight portion 36 and a distal connector portion 38 connected to the bight portion 36 and depending downwardly therefrom forming a clearance gap 39. The tongue 6 may be raised and lowered by raising or lowering the draft arms 22. Goose neck tongues are well known in the industry. Examples of the foregoing implements include RB Scrapers, DB Scrapers and TL Rollers available from Hoelscher, Inc. of Bushton, Kans.

The two forms of coupler 4 are best seen in FIGS. 3–6. The coupler 4 includes three pivot arrangements designated generally 41, 42 and 43. The coupler 4 includes a trunnion 45 which is in the form of a flat cross bar having opposite ends 46, 47. The pivot arrangement 41 includes a pair of pivot pins 49 each extending outwardly from its respective end 46, 47 and adapted for pivoting receipt within the pivot balls 27 of the draft arms 22. A hitch pin 28 or other suitable keeper 28 is utilized to retain the pins 49 within the balls 27 and connected to the draft arms 22. The trunnion 45 and pins 49 can pivot about a generally horizontal axis through the pins 49 and the balls 27. As used herein the terms vertical and horizontal are used in the reference frame of the tractor and implement being on a horizontal surface. However, it is to be understood that in the use of the tractor and implement that many times the tractor and implement will not be on a horizontal plane or a common plane. The pivot axis X of the pins 49 and trunnion 45 is also generally parallel to the axis of the rear axles of the tractor. It is to be understood however that the draft arms may be adjustable relative to one another to induce a side to side (of the tractor) cant in the trunnion 45 changing the plane of the X pivot axis from horizontal to non-horizontal but it is still considered generally horizontal as used herein. The X pivot axis extends through the trunnion 45 and is preferably generally centrally located therein.

Figure 3:
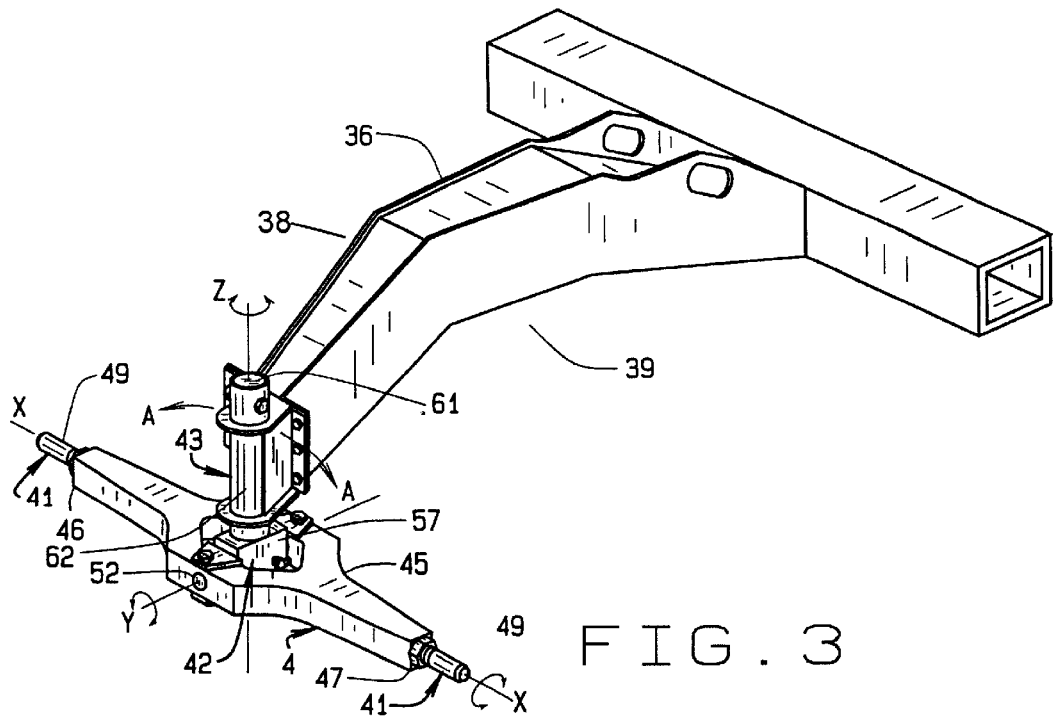
FIG. 3 is an enlarged perspective view of one form of coupler device.
Figure 5:
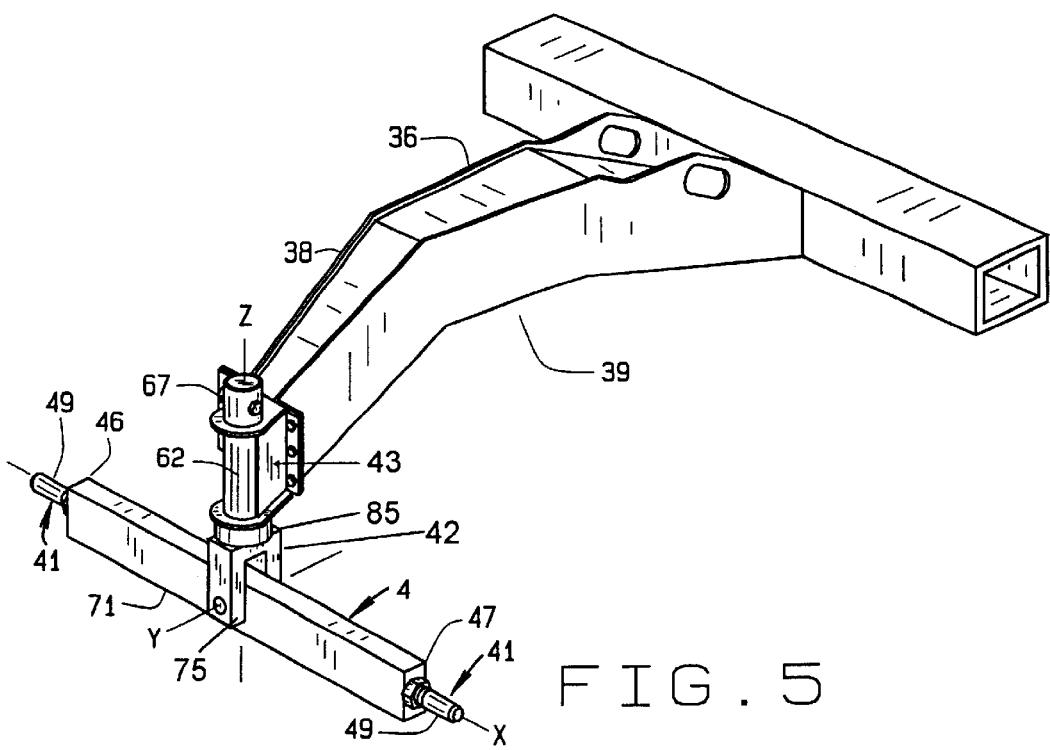
FIG. 5 is an enlarged perspective view of a second form of coupler device.
Figure 4:
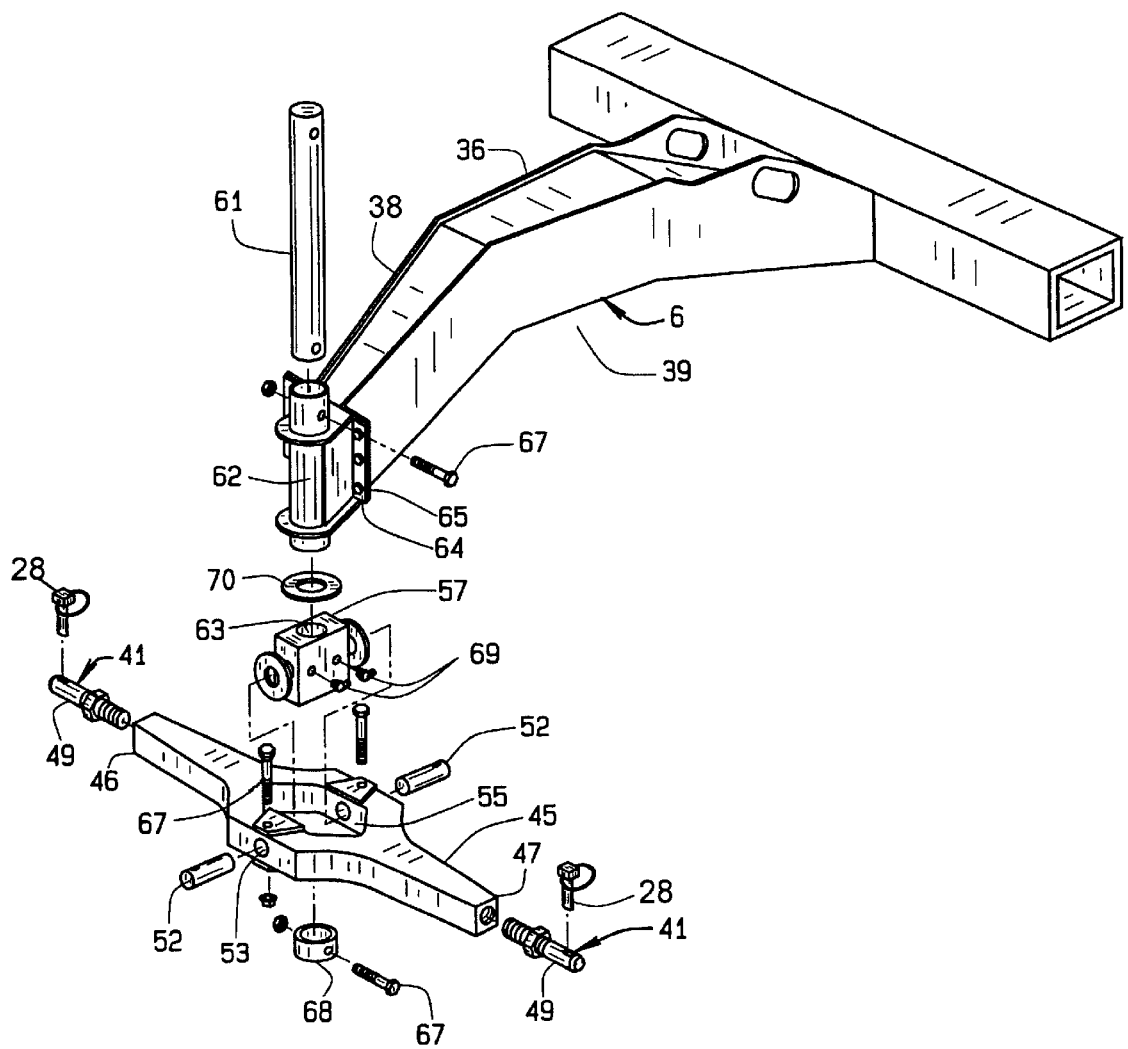
FIG. 4 is an exploded view of the coupler as seen in FIG. 3.
Figure 6:
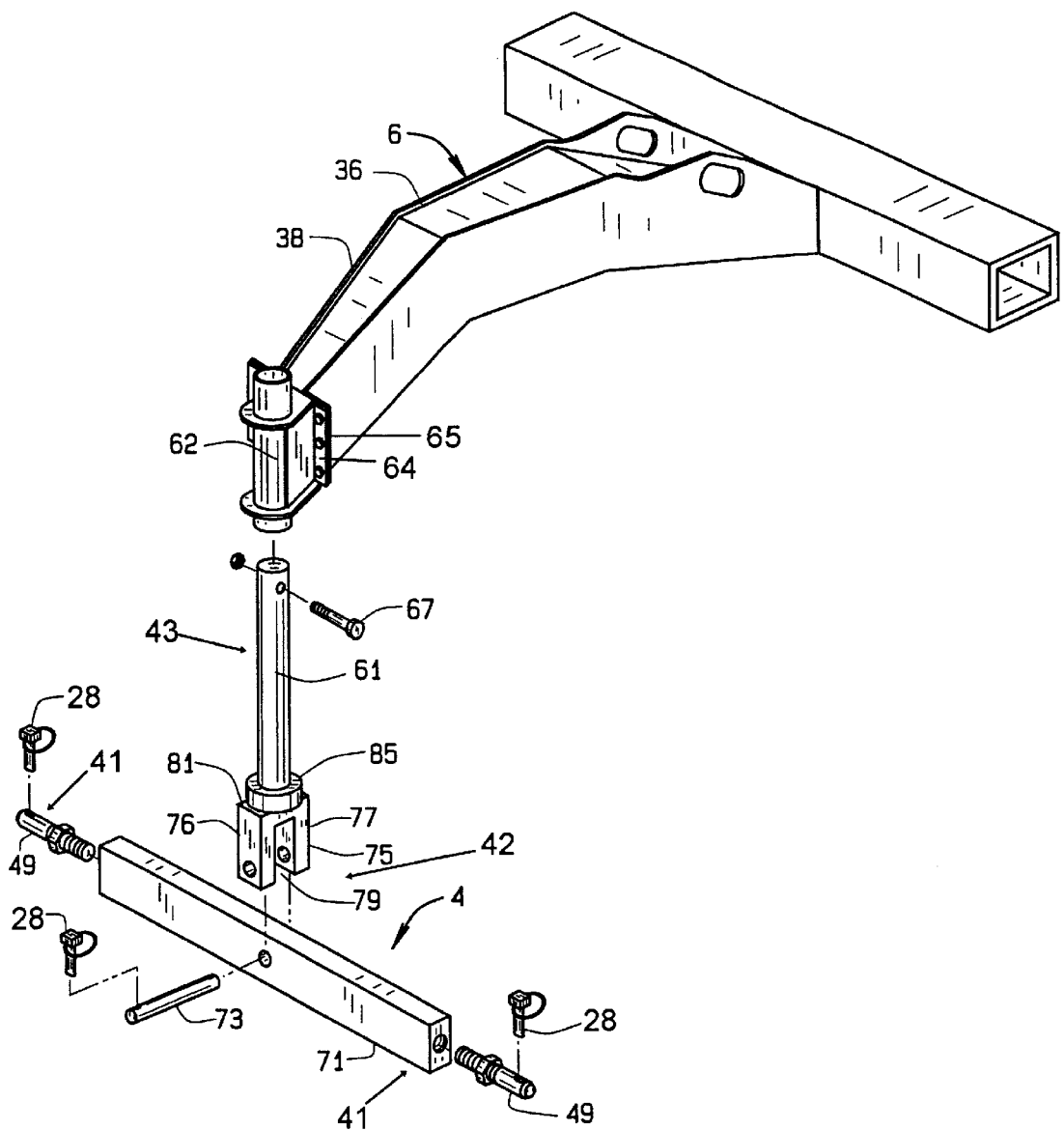
FIG. 6 is an exploded view of the coupler of FIG. 5.

Two forms of pivots 42 are illustrated in FIGS. 3–6. The first form of pivot 42 is shown in FIGS. 3 and 4 and the second form is shown in FIGS. 5 and 6. In the first form of the invention (FIGS. 3 and 4), the pivot 42 includes a pair of pivot pins 52 removably mounted in a through bore 53 through the trunnion 45. An opening 55 extends between opposite faces of the trunnion 45 with the bore 53 opening into the opening 55 on opposite sides thereof. A coupler 57 such as a bearing block or other suitable pivot member is pivotally mounted on the pins 52 for rotation or pivoting movement about the Y axis within the opening 55. Mounting the coupler 57 within the opening 55 provides a low profile for the coupler 4. The opening 55 is sized such that the coupler 57 when in cooperative interengagement with the pivot device 43 can move, as shown by the arrows A, in a plane generally normal to the Y axis plus or minus about 45°. This plane of movement extends generally transverse to the longitudinal axis of the tractor. The plane of movement may be changed relative to the ground by pivoting the trunnion 45 about the X axis.

The pivot 43, in the illustrated embodiment of FIGS. 3, 4 is shown as a pintle type pivot and includes a pin 61 cooperatively interengageable with a sleeve or socket 62 such that the trunnion 45 and tongue 6 can pivot relative to one another to provide pivoting about a Z axis. As shown, the pin 61 is mounted to the coupler 57 and is generally upstanding therefrom and the trunnion 45. In the illustrated embodiment, the pin 61 extends through a through bore 63 of the coupler 57 and be rotatable relative thereto. The Z axis can be and is shown as generally vertical including its movement about the X and Y axes. In the illustrated structure, the socket 62 is secured to the tongue 7 preferably at the distal end of the tongue portion 38. The socket 62 is preferably secured to the tongue 7 in a removable manner as by a plate 64 bolted to a corresponding plate 65 permanently secured to the tongue portion 38. A keeper 67 allows the pin 61 to be removed from the socket 62 for separation of the coupler 4 from the implement 7. A cylindrical bushing 68 is sleeved onto the lower portion of the pin 61 with the coupler 57 positioned between the bottom of the socket 62 and the top of the bushing 68. A second keeper 67 also releasably secures the pin 61 to the coupler 57 and socket 62. The bushing 68 acts as a spacer and a thrust washer. In normal use, the pin 61 may be left attached to the tongue 7 if desired. Suitable lubricating devices such as zerk grease fittings 69 may be provided for the pivots 41, 42, 43.

In the illustrated embodiments of the coupler 4, the X and Y axes lie generally in the same plane which is shown as a generally horizontal plane while the Z axis lies in a plane generally normal to the plane of the X and Y axes and is shown as a generally vertical plane when the pivots 41, 42, 43 and are each in a neutral or normal position, as shown in the Figures. The X, Y and Z axes are generally normal to one another. The X, Y and Z axes substantially intersect with one another and particularly the X and Y axes substantially intersect providing the low profile arrangement. It is preferred that the X, Y and Z axes substantially intersect with one another by passing within approximately 3 inches of each other more preferably within about 2 inches of each other and most preferably within about 1 inch of each other. Preferably the pivot pins 49, 52 and 61 are removable for maintenance purposes. The pins 49 may be threaded into the trunnion 45 while the pins 52 may be held within the bore 53 by a screw or bolt 67 or frictional engagement. The pin 61 may, in addition to the mounting described above, be threaded into the coupler 57 and rotatable in the socket 62 or may be permanently attached thereto and replaceable either on its own or in combination with the coupler 57. A spacer 70 can be used to space the bottom of the socket 62 from the coupling 57 to permit the pivotal movement of the pin 61 about the pivot pins 52. Such a spacer may be, for example, a thrust washer or bushing sleeved over the pin 61 or could be part of the socket 62. The Y pivot axis is generally parallel to the longitudinal axis of the tractor 1 while the pivot axis X is generally transverse to the longitudinal axis of the tractor. The Y pivot axis moves in a plane that is generally transverse to the longitudinal axis of the tractor when the pin 61 is in a generally vertical plane.

FIGS. 5, 6 illustrate an alternate embodiment of the coupler. It includes a trunnion in the form of a cross bar or tow bar 71 similar to the trunnion 45 but without the need for through opening 55. The bar 71 has pins 49 secured to and extending from opposite ends thereof. One or two pivot pins 73 can be used to connect a clevis 75 to the bar. The clevis 75 has arms 76, 77 forming a gap 79 therebetween which receives the bar 71 therein. As shown, the pin 73 extends through each of the arms 76, 77 and pivotally mounts the clevis 75 to the bar 71 and can be removably secured to the clevis 75 and bar 71 with hitch pins 28. The clevis can pivot about the Y axis as does the coupler 57. A cross member 81 joins the arms 76, 77 together and provides a mounting member for the pin 61. The pin 61 is secured to the clevis 75 as by threaded engagement or welding or may be integral therewith. The pin 61 rotates relative to the socket 62. A bearing bushing 85 may be sleeved over the pin 61 to be positioned between the clevis 75 and socket 62. In function and arrangement of the X, Y and Z axes, the coupler 4 shown in FIGS. 5, 6 is the same as that of the coupler 4 shown in FIGS. 3, 4.

In operation, the implement 7 is towed behind the tractor 1 with the implement being pivotable relative to the tractor about three axes to accommodate for changes and differences in terrain supporting the tractor and implement. The tractor 1 may turn left and right allowing the implement to pivot on the pivot arrangement 43. The goose neck tongue 6 may be high enough to accommodate sharp turns by providing clearance over the top of the tires and fenders on the rear of the tractor. The implement and tractor may pivot relative to one another about the axis X to accommodate ditches, hills, etc. A left-right slope change between the implement and tractor, as viewed from the operators position can be accommodated by rotation about the Y axis. Because of the low profile, the moment applied to the hitch arrangement from the force needed to pull or resist forward movement of the implement relative to the tractor is reduced. Also, by having the X, Y and Z axes substantially intersect, the magnitude of other moments may be reduced. Also, by having the Z axis over the draft arms and close to the end of the tractor, the downward force on the tractor hitch can be reduced (relative to trailing hitches) thereby reducing the tendency of the front wheels to pick up from the ground.

The use of the inventive coupler 4 facilitates attachment of the tractor 1 to the implement 7 and alignment of the draft arms 23 with the pins 49 to effect the attachment. The operator backs the tractor 1 into approximate position relative to the implement, may then exit the tractor 1 to place one pin 49 in a respective ball 23 and attach the pin to the draft arm with a suitable keeper. Because of the pivoting nature of the pivots 41, 42, 43, the free or unattached end of the pivot 41 may be simply and without the application of force to lift the implement align the other pin 49 with its ball by up and down or forward and back movement of the pin 23 and insert the pin into the ball 23. A suitable keeper would then be placed on that pin 49 to releasably attach the coupler to the tractor hitch.

Thus, there has been shown and described several embodiments of an implement coupler. As is evident from the foregoing description, certain aspects of the present invention are not limited by the particular details of the examples illustrated herein and it is therefore contemplated that other modifications and applications, or equivalents thereof, will occur to those skilled in the art. Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed:

1. A coupler for connecting an implement to a work machine, the coupler includes:

a cross bar with opposite ends and top and bottom portions on opposite sides thereof;

a pair of first pivot devices each connected to the cross bar adjacent each of said opposite ends of the cross bar, said first pivot device has a first pivot axis;

a second pivot device secured to the cross bar and has a second pivot axis, said second pivot axis crossing the first pivot axis and substantially intersects the first pivot axis at a position within the perimeter of the cross bar; and a third pivot device secured to the second device, the third pivot device has a portion movable in a plane generally normal to the second pivot axis.

2. A coupler as set forth in claim 1 wherein the cross bar includes a central portion with an opening therein and the second pivot includes a second pivot pin extending into the opening and a member pivotally mounted on the second pivot pin, at least a portion of the member is positioned in the opening.

3. A coupler as set forth in claim 2 wherein the opening extends through the cross bar and has a side periphery circumscribed completely by portions of the cross bar.

4. A coupler as set forth in claim 3 wherein the third pivot device includes a third pivot pin secured to the member and movable about the second pivot axis in a plane generally perpendicular to the second pivot axis, the third pivot pin extends longitudinally of the third pivot device and substantially intersects the first and second pivot axis.

5. A coupler as set forth in claim 1 wherein the second pivot device includes at least one pivot member with an arm pivoted to the cross bar, a portion of the third pivot device is secured to the arm.

6. A coupler as set forth in claim 5 wherein the pivot member includes two said arms with a light portion therebetween forming a clevis with the cross bar being received in a gap between the arms, said second pivot device includes a second pin pivotally connecting the clevis to the cross bar.

7. A coupler as set forth in claim 6 wherein the third pivot device includes a third pivot pin secured to the clevis and is movable in a plane generally normal to the second pivot axis.

* * * * *